US008377161B2

(12) United States Patent
Lee

(10) Patent No.: US 8,377,161 B2
(45) Date of Patent: Feb. 19, 2013

(54) INTEGRATED AIR INTAKE SYSTEM

(75) Inventor: Sang-Il Lee, Suwon-shi (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 125 days.

(21) Appl. No.: 12/944,388

(22) Filed: Nov. 11, 2010

(65) Prior Publication Data

US 2012/0073539 A1 Mar. 29, 2012

(30) Foreign Application Priority Data

Sep. 28, 2010 (KR) ........................ 10-2010-0093826

(51) Int. Cl.
*B01D 46/00* (2006.01)

(52) U.S. Cl. .................................. 55/385.3; 123/198 E

(58) Field of Classification Search ................. 55/385.3, 55/419, 420, 306, 497, 500, DIG. 30; 123/198 E, 123/184.53, 184.56; 96/399, 407, 383, 386, 96/380, 381; 180/68.3
See application file for complete search history.

(56) References Cited

U.S. PATENT DOCUMENTS 5,921,214 A * 7/1999 Fujita et al. ............... 123/198 E
6,736,871 B1 * 5/2004 Green et al. ................ 55/385.3
6,863,044 B2 3/2005 Nakamura et al.
7,789,924 B2 * 9/2010 Waltenberg et al. ......... 55/385.3
8,137,425 B2 * 3/2012 Saito et al. .................. 55/385.3
2004/0093839 A1 * 5/2004 Storz ............................ 55/385.3
2009/0084344 A1 * 4/2009 Fasan ........................ 123/198 E
2012/0110964 A1 * 5/2012 Alexander et al. ........... 55/385.3

FOREIGN PATENT DOCUMENTS

EP 0 787 613 B1 9/2001
JP 2003-161216 A 6/2003
JP 2003-343371 A 12/2003

* cited by examiner

*Primary Examiner* — Duane Smith
*Assistant Examiner* — Minh-Chau Pham
(74) *Attorney, Agent, or Firm* — Morgan, Lewis & Bockius LLP

(57) ABSTRACT

An integrated air intake system may include an integrated body formed by combining a cylinder head cover at the top of an engine with an air cleaner body at a side of the cylinder head cover, an air duct connected to a side of the air cleaner body to make a channel for air sucked from the outside into the air cleaner body, an upper cover combined in contact with the air cleaner body at the top thereof, an intake hose connected to a side of the upper cover to supply purified air to an engine intake port, and an intake filter disposed in a space formed in the air cleaner body and the upper cover to purify the air sucked from the outside.

4 Claims, 5 Drawing Sheets

INTEGRATED AIR INTAKE SYSTEM

CROSS-REFERENCE TO RELATED APPLICATION

The present application claims priority to Korean Patent Application No. 10-2010-0093826 filed on Sep. 28, 2010, the entire contents of which is incorporated herein for all purposes by this reference.

BACKGROUND OF THE INVENTION

1. Field of the Invention

The present invention relates to an air intake system, and more particularly, to an integrated air intake system that is disposed to correspond to an internal space of a narrow engine room and makes it possible to reduce the manufacturing cost.

2. Description of Related Art

In general, in air intake systems of vehicles, an air duct that is made of plastic and rubber and directly introduce external air, an air cleaner that removes foreign substances by filtering the introduced external air, and an air intake hose that supplies the filtered air into the engine are sequentially connected.

Further, a plurality of resonators may be provided in the space between the air duct and the air intake hose to prevent noise generated in sucking air.

The air intake systems are mounted on the car body of vehicles or separately mounted at the upper end of the engine.

However, due to the spatial limit in engine rooms, which have been narrowed by the manufacturing tendency of the recent vehicles, the intake systems are usually directly mounted on the top of the engine. When the intake system is mounted on the top of the engine, it is required to use a material for preventing thermal damage in order that the intake system is not damaged by heat from the engine, which increases the manufacturing cost.

Further, since an air cleaner is disposed at the top of the engine, the gap between the inside of the engine room and the hood is decreased and shock due to a collision is fully transmitted, such that it is difficult to abide by the pedestrian protection rules for protecting pedestrians in a collision of a vehicle and a pedestrian.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an air intake system having improved structure and arrangement position, in order to be disposed to correspond to the internal space of a narrow engine room and make it possible to reduce the manufacturing cost.

In an aspect of the present invention, the integrated air intake system may include an integrated body formed by combining a cylinder head cover at the top of an engine with an air cleaner body at a side of the cylinder head cover, an air duct connected to a side of the air cleaner body to make a channel for air sucked from the outside into the air cleaner body, an upper cover combined in contact with the air cleaner body at the top thereof, an intake hose connected to a side of the upper cover to supply purified air to an engine intake port, and an intake filter disposed in a space formed in the air cleaner body and the upper cover to purify the air sucked from the outside.

The cylinder head cover and the air cleaner body of the integrated boy may be integrally formed by injection molding.

The cylinder head cover and the air cleaner body of the integrated boy may be monolithically formed by injection molding.

The air cleaner body may be integrally formed at a side of the cylinder head cover while extending toward a crankshaft.

The air duct may be disposed perpendicular to the crankshaft, at a side of the upper cover, and an intake port may be formed at the side of the air cleaner body.

The cylinder head cover, the air cleaner body and the air duct may be disposed in series along a crankshaft while the upper cover may be connected on top of the air cleaner body.

The intake port opens upwards to receive the air duct downwards.

The air duct and a discharge port of the upper cover may be disposed substantially in parallel, the intake hose being connected to the discharge port.

The upper cover may have the same cross-section as the air cleaner body to seal the air cleaner body, and a discharge port may be formed at the side of the upper cover and connected with the intake hose.

According to the exemplary embodiment of the present invention having the above configuration, unlike the related art in which an air duct and an intake hose are mounted on a cylinder head cover, they are positioned at an outer side of the air cleaner without overlapping the cylinder head cover, such that a sufficient gap from a hood can be ensured. Therefore, it is possible to increase the spatial usability of the engine room and has an advantage in terms of the rules for pedestrian, by removing the spatial limit in the height.

Further, since the air cleaner body can be integrally manufactured from the same material as the cylinder head cover, it is possible to remove the parts for fastening, such that it is possible to reduce the weight of a vehicle and reduce the manufacturing cost by replacing the material for the upper cover, as compared with the related art in which the cylinder head cover and the air cleaner body are individually manufactured.

Further, since the air duct and the intake hose are positioned without overlapping the cylinder head cover, it is possible to increase application to vehicles.

Further, since it is possible to make the intake hose as long as possible because the intake hose is formed individually from the air cleaner and the upper cover, it is possible to contribute to improving the performance at low/middle speed torque.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
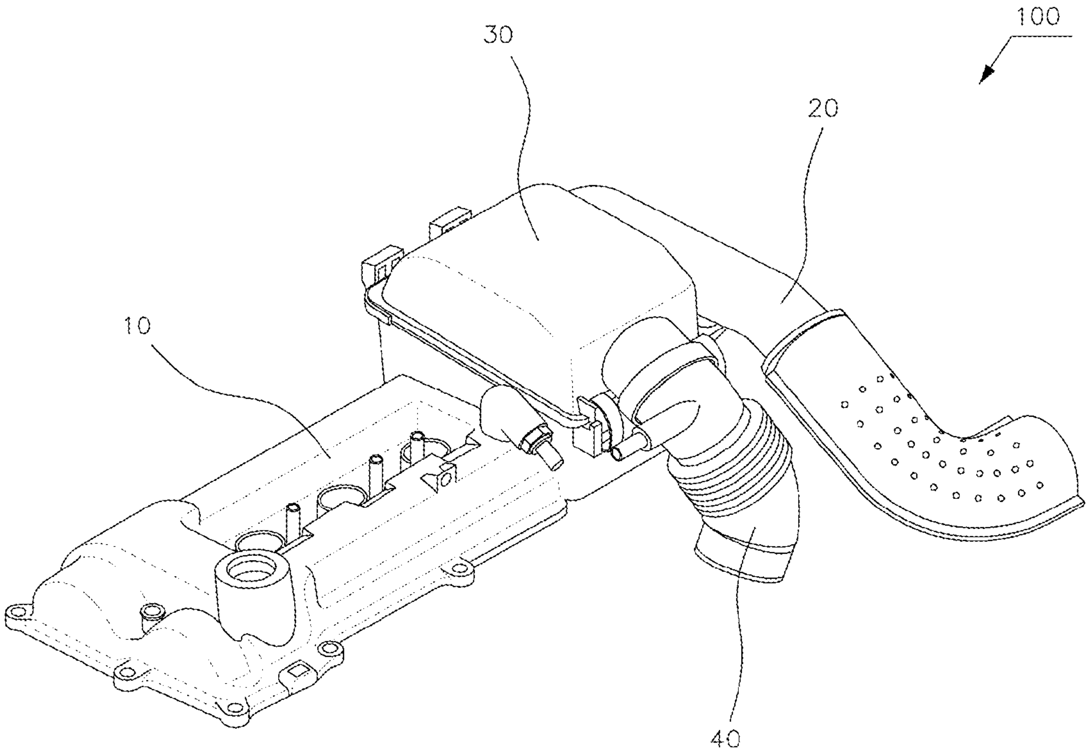
FIG. 1 is a perspective view showing an integrated air intake system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

An integrated air intake system 100 according to an exemplary embodiment of the present invention includes: an integrated body 10 formed by combining a cylinder head cover 11 at the top of an engine with an air cleaner body 12, an air duct 20 connected to one side of the air cleaner body 12 to make a channel for air sucked from the outside, an upper cover 30 combined in contact with the air cleaner body 12, an intake hose 40 connected to one side of the upper cover 30 to supply purified air to an engine intake port, and an intake filter 50 disposed in the space in the air cleaner body 12 and the upper cover 30 to purify the air sucked from the outside.

That is, as shown in FIG. 1, the cylinder head cover 11 covers the top of the engine and the air cleaner body 12 has a predetermined space therein to accommodate the intake filter 50 that filters dusts or floating particles in the air sucked from the outside.

Figure 3:
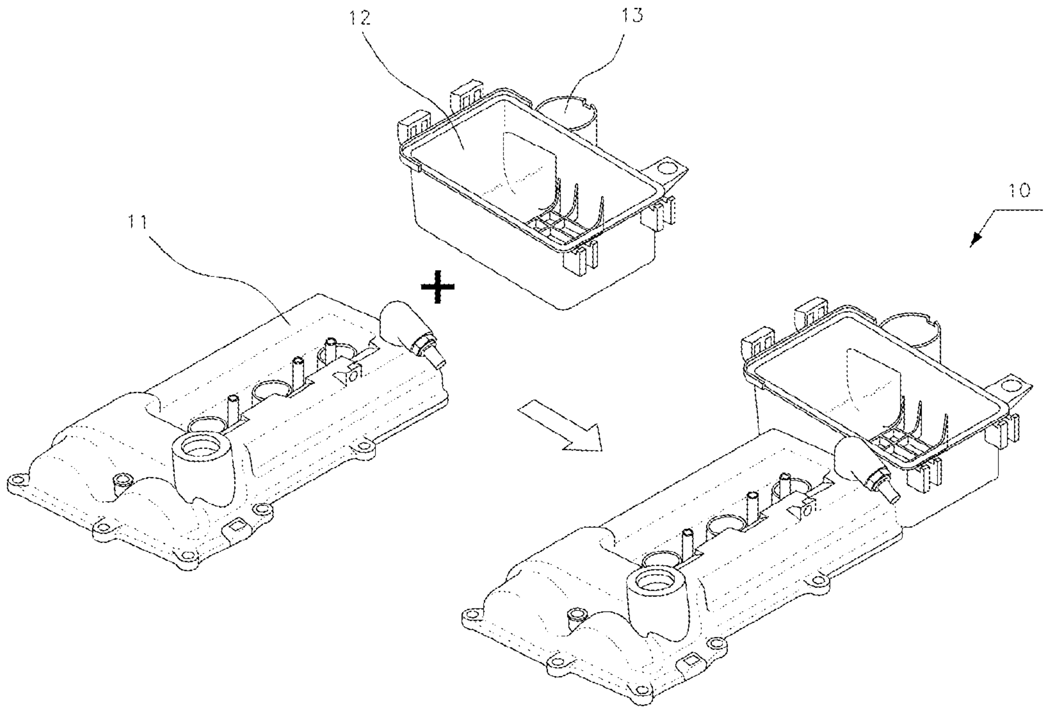
FIG. 3 is a perspective view showing an integrated body used in the present invention.

Unlike the related art in which a cylinder head cover 11 and an air cleaner body 12 are individually manufactured and then combined, in an exemplary embodiment of the present invention, in manufacturing the cylinder head cover 11 and the air cleaner body 12, as shown in FIG. 3, the air cleaner body 12 is connected to one side of the cylinder head cover 11, which is integrally injection-molded.

Figure 5:
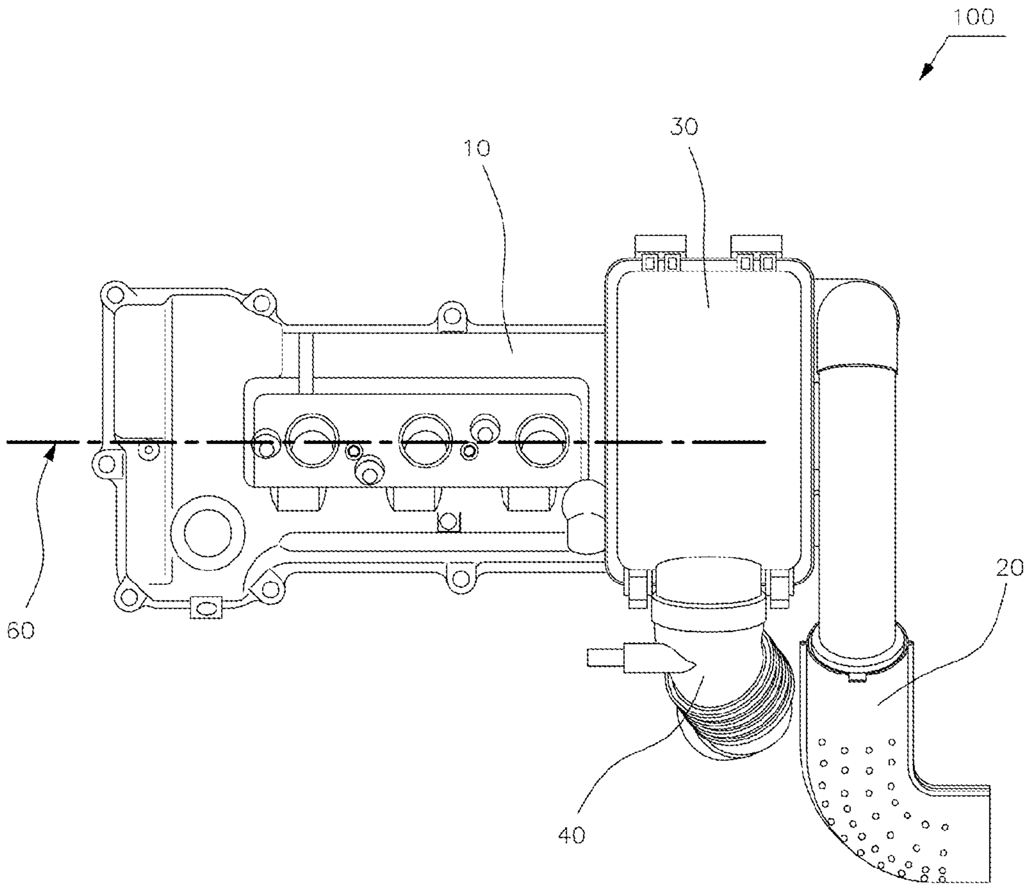
FIG. 5 is a plan view showing the integrated air intake system according to an exemplary embodiment of the present invention.

When the air cleaner body 12 is integrally formed at one side of the cylinder hear cover 11, as shown in FIG. 5, it is preferable that the air cleaner body is formed at one side that longitudinally extends toward the crankshaft 60 of a vehicle.

Further, an intake port 13 is formed at one side of the air cleaner body 12, and the air duct 20 is connected to the intake port 13 to suck air from the outside.

That is, one end of the air duct 20 is open to suck the external air and the other end is connected to the intake port 13 such that the air sucked into the air duct 20 can flow into the air cleaner body 12.

It is preferable that the air duct 20 is positioned at the outer side of the air cleaner body 12 which is the opposite side of the side where the air cleaner body 12 is connected with the cylinder head cover 11, perpendicular to the crankshaft 160, and accordingly, it is positioned without overlapping the cylinder head cover 11, thereby achieving individual free operation.

Figure 2:
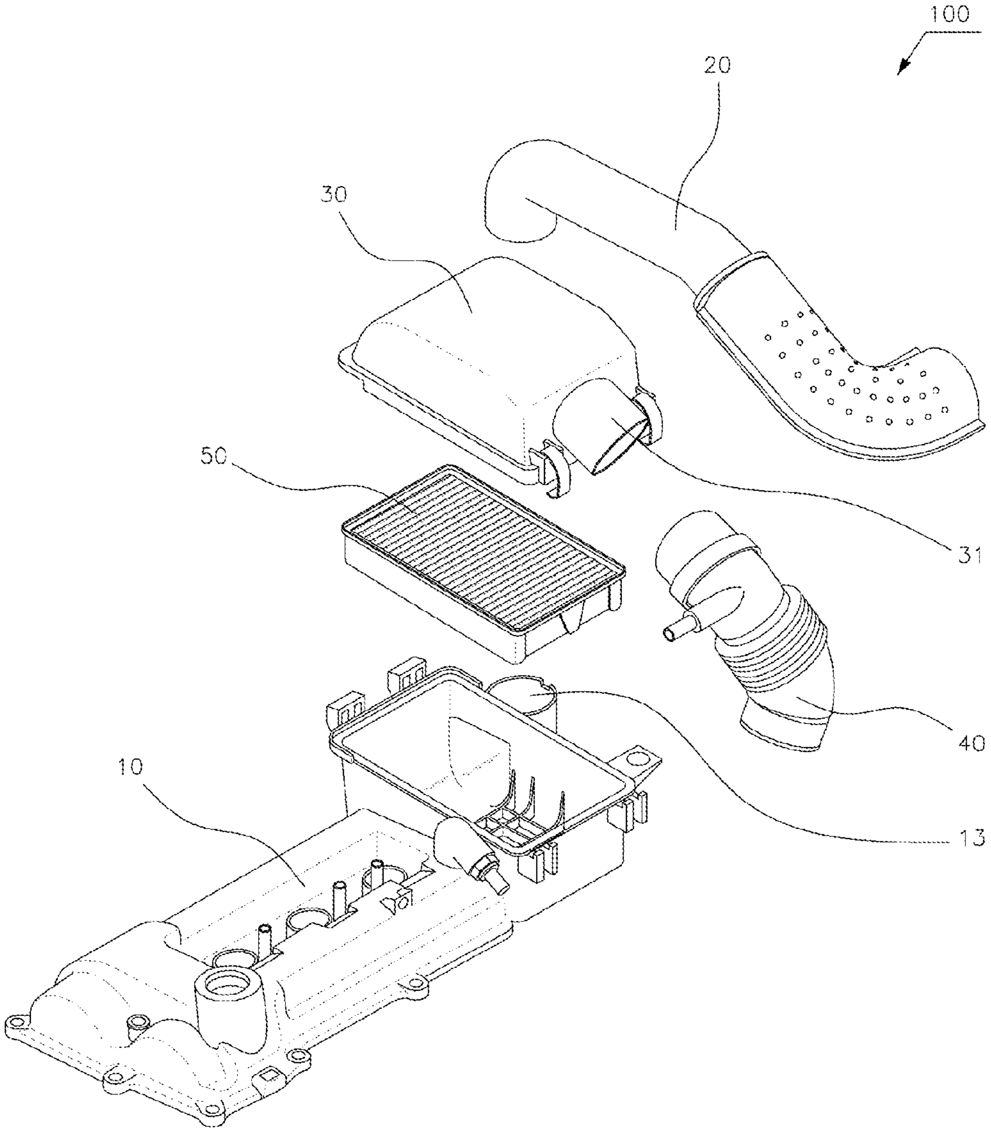
FIG. 2 is an exploded perspective view showing the integrated air intake system according to an exemplary embodiment of the present invention.

Further, the upper cover 30 is positioned on the air cleaner body 12 to prevent the air flowing therein from leaking, and as shown in FIG. 2, it is preferable that the upper cover 30 has the same cross-section as the air cleaner body 12 to seal the air cleaner body 12.

Therefore, it is possible to freely adjust the position of the air duct 20 connected to one side of the air cleaner body 12 and the length of the air duct 20 and it is also possible to more smoothly combine the parts in the engine room and manufacture the vehicle. Further, the upper cover 30 and the air duct 20 are not in contact or supported by each other, such that noise and vibration that have been generated by the contact can be precluded.

Meanwhile, a discharge port 31 is formed at one side of the upper cover 30 and an intake hose 40 is connected to the outlet port 31 to guide the filtered air to the engine intake port.

That is, since the upper cover 30 and the air cleaner body 12 are formed in the same size in an exemplary embodiment of the present invention, it is possible to increase the length of the intake hose 40 connecting the discharge port 31 with the engine intake port in comparison to the related art, such that it is possible to improve performance at low and middle speed torque.

Similarly, the intake hose 40 can be positioned regardless of the cylinder head cover 11 and the air cleaner body 12, such that it is possible to increase spatial usability of the engine room and improve safety, which achieve wide application for vehicles.

Further, since it is possible to adjust resistance of the intake air by individually modifying the positions and lengths of the air duct 20 and the intake hose 40, it is possible to remove a resonator, which has been additionally provided, and accordingly it is possible to ensure the space for the engine room and reduce the manufacturing cost.

The process of assembly and operation of the integrated air intake system 100 according to the exemplary embodiment of the present invention is described hereafter.

An integrated body 10 composed of the cylinder head cover 11 and the air cleaner body 12 is manufactured by injection molding. The integrated body 10 is mounted on the engine.

The intake filter 50 is mounted inside the air cleaner body 12. Thereafter, the upper cover 30 is disposed to cover the air cleaner body 12 to seal the air cleaner body 12 while the discharge port 31 of the upper cover 30 and the engine intake port are connected by the intake hose 40.

Meanwhile, the air duct 20 is disposed at an outer side of the air cleaner body 12 to communicate with the intake port 13 of the air cleaner body 12.

Figure 4:
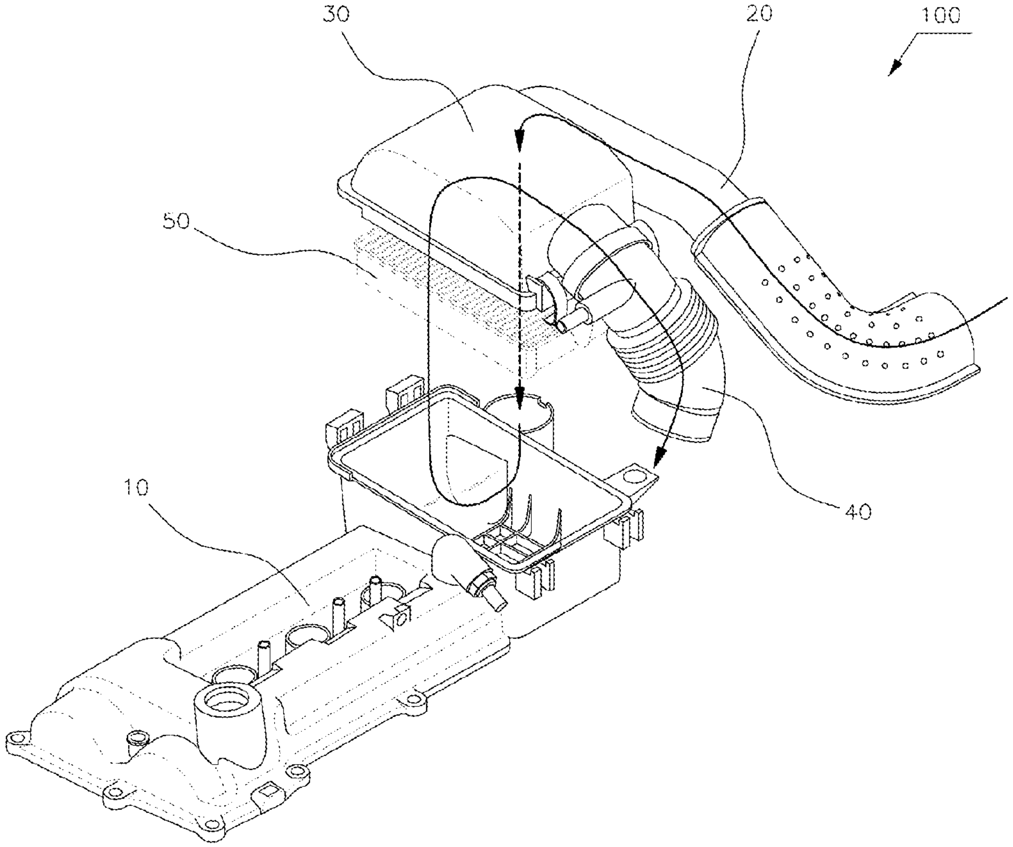
FIG. 4 is a perspective view showing air flow in the integrated air intake system according to an exemplary embodiment of the present invention.

According to the exemplary embodiment of the present invention described above, as shown in FIG. 4, when the external air sucked into the air duct 20, the air duct 20 guides the external air into the air cleaner body 12. Thereafter, the intake filter 50 disposed in the air cleaner body 12 filters dusts and floating substances in the external air and the filtered air is discharged through the discharge port 31 of the upper cover 30. The air discharged through the discharge port 31 of the upper cover 30 is sucked into the engine through the intake hose 40.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated air intake system comprising:

an integrated body formed by combining a cylinder head cover at the top of an engine with an air cleaner body at a side of the cylinder head cover;

an air duct connected to a side of the air cleaner body to make a channel for air sucked from the outside into the air cleaner body;

an upper cover combined in contact with the air cleaner body at the top thereof;

an intake hose connected to a side of the upper cover to supply purified air to an engine intake port; and an intake filter disposed in a space formed in the air cleaner body and the upper cover to purify the air sucked from the outside;

wherein the cylinder head cover and the air cleaner body of the integrated boy are integrally formed by injection molding;

wherein the air cleaner body is integrally attached at a side of the cylinder head cover while extending toward a crankshaft;

wherein the air duct is disposed perpendicular to the crankshaft, at a side of the upper cover, and an intake port is formed at the side of the air cleaner body;

wherein the cylinder head cover, the air cleaner body integrally attached to the cylinder head cover, and the air duct are attached in series along the crankshaft while the upper cover is connected on top of the air cleaner body, and wherein the intake port opens upwards to receive the air duct downwards.

2. The integrated air intake system according to claim 1, wherein the cylinder head cover and the air cleaner body of the integrated boy are monolithically formed by injection molding.

3. The integrated air intake system according to claim 1, wherein the air duct and a discharge port of the upper cover are disposed substantially in parallel, the intake hose being connected to the discharge port.

4. The integrated air intake system according to claim 1, wherein the upper cover has the same cross-section as the air cleaner body to seal the air cleaner body, and a discharge port is formed at the side of the upper cover and connected with the intake hose.

* * * * *